UNITED STATES PATENT OFFICE.

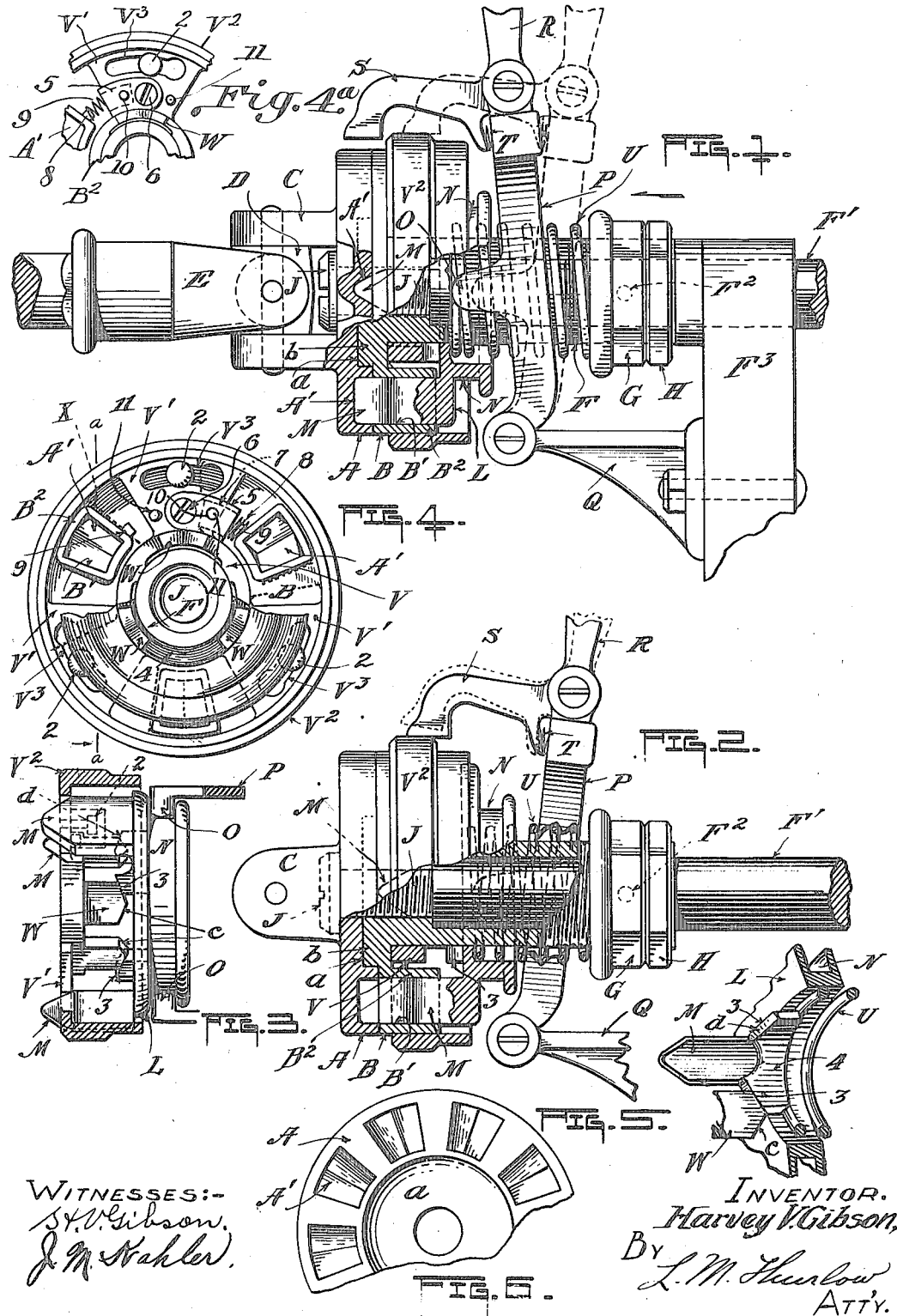

HARVEY V. GIBSON, OF PEORIA, ILLINOIS.

CLUTCH.

1,208,136.  Specification of Letters Patent.  Patented Dec. 12, 1916.

Application filed April 28, 1914. Serial No. 835,057.

*To all whom it may concern:*

Be it known that I, HARVEY V. GIBSON, a citizen of the United States, residing at Peoria, in the county of Peoria and State of Illinois, have invented certain new and useful Improvements in Clutches; and I do hereby declare that the following is a full, clear, and exact description of the invention, which will enable others skilled in the art to which it appertains to make and use the same.

This invention relates to a clutch.

It pertains more particularly to a clutch whose parts when in operative or engaging relation, connect a driving and a driven member, one of them having permanent connection with a driven part or machine performing work, the other having permanent connection with a driving part or power furnishing device.

The invention further relates to a two part clutch so constructed that the driving or power transmitting relation of the driving and the driven parts will be maintained until an overload occurs, whereupon the portions of the clutch will be automatically separated and maintained in that relation thereby removing all danger of breakage to the parts of the machine or part being driven.

One of the objects of the invention, therefore, is to provide in a clutch a part for connection with a power member and a part for connection with a driven member, together with a part to connect them in driving relation until an overload occurs whereupon the last named part will be thrown out automatically to release and terminate the driving or power transmitting relation and so maintain it.

Another object is to construct a clutch having a part connected with a driven element and a part connected with a driving element, and including a member for connecting the parts to be automatically thrown out under overload, and also including means to maintain said member in the position to which it is moved and, in addition, when the driven element has been restored to its proper running condition that the clutch can be restored to its driving condition manually, while the power element is in continual rotation or without stopping the power to restore the driving relation.

Another object is to construct a clutch parts of which will lend themselves to automatic disengagement under load and maintain the disengaged relation, said clutch including means by which the parts can be manually restored to the working relation without interrupting the rotation of the power element or driving element.

Another object is to construct a clutch that can be used as a coupling or in connection with a knuckle joint or universal joint extensively used with many types of machinery such as grain dumps, elevators and the like, where horse-power or any other form of power is employed, the clutch being also adapted for use with reverse gears, being constructed so as to disengage while driving in either direction.

Another object is to improve upon the structure shown in my pending application for clutch, No. 784,210 filed Aug. 11, 1913.

Other objects and advantages, including details of construction, will appear herein aided by the accompanying drawing forming a part of this application and in which reference characters correspond with those of the specification.

Figure 1 is an elevation of the clutch in connected relation with a driving part and a driven part, parts of the clutch being shown in section. Fig. 2 is a similar view showing an operating lever in a different position from that illustrated in Fig. 1. Fig. 3 is a side elevation of two portions for maintaining certain of the clutch parts separated. Fig. 4 is an end elevation showing the face of certain of the clutch portions as seen in the direction of the dart in Fig. 1, one of the parts being broken away to show interior structures. Fig. 4ᵃ is a detail of a spring-barrel showing a reversed position from that in Fig. 4. Fig. 5, shows portions of the clutch in perspective, and Fig. 6 shows a portion of the face of one of the clutch portions.

Various types of clutches having the adaptability of automatically disengaging under overload have been brought out but I am not aware of a clutch whose parts after having been separated can be conveniently and readily restored to their driving relation at the will of the operator without stopping the power element or driving element, and therefore, as intimated in the objects, one of the particular purposes is to include in a clutch structure a part for manually restoring the clutch parts to their driving relation during constant rotation of the power or without stopping the power, also that by means of said part the clutch parts can be manually disengaged during said constant rotation.

The two main parts of the clutch are represented by A and B. One of these, A, preferably has a socket $a$ in its inner surface to receive an extended portion or boss $b$ having a free turning fit therein. On its opposite surface the part A is provided with a pair of spaced ears C between which is pivotally held any usual member D, the whole, together with a yoke E, constituting any usual knuckle joint, or universal joint, used on various types of machinery. The part B has a central hub F cast with it which at its outer free end is provided with screw threads to receive a nut G and a lock nut H. The hub is bored to receive a shaft F' which may be the part connected with either the power element or the driven machine element as desired. The shaft is supported in a bearing $F^3$ which together with a second bearing, not shown, serves to support the clutch and the yoke E. A pin $F^2$ extends through the hub and shaft fixing the two together in permanent driving relation. The inner face of the part A is provided with a series of V-shaped sockets A', Figs. 1 and 6. Extending through the part B is a series of holes B'. Projecting from and cast with that face of the part B from which the hub F extends are guides $B^2$, said holes B' being extended through them as clearly shown in Figs. 1 and 2. The faces of said parts A and B are held against one another in permanent relation by any suitable means. For instance a screw J extends into the hub F, its head lying outside the part A, as indicated in Figs. 1 and 2.

L is a ring from one of whose faces extend spaced fingers M corresponding in number and position to the holes A' and B' in the parts A and B respectively, Fig. 4. The ends of said fingers are beveled in opposite directions, as indicated, so as to have substantially the same form as the sockets A', see Fig. 1, and slidably fit the said holes B'. The said ring L includes in its construction a portion having a groove N to receive the parts O of a forked lever P pivoted at its lower ends upon a bracket Q or other portion. Pivoted on the top of said forked lever P is a hand piece R of which an arm-extension S is a part, and an expanding spring T interposed between a portion of said extension S and said lever P serves to hold said hand piece R in one of its extreme positions shown in dotted lines in Fig. 2.

U is a coil spring interposed between parts of the ring L and the nut G on said hub F, and is placed under compression by the said nut to hold the fingers M firmly but elastically in the sockets A' of the part A.

The degree of compression imparted to the spring U through the nut G determines the force required or the amount of overload necessary to throw the fingers M out of the sockets A' in the disengagement of the clutch parts. It is clear that while the part A may be the driving portion and part B may be the driven portion the reverse may be the case. In any event, if the driven machine is suddenly placed under great strain due to any cause the strain or overload placed upon the parts beyond the point for which the spring U is set, the clutch rotating anti-clockwise as viewed in Fig. 4, the points of the fingers M will ride up upon the surfaces of the part A within sockets A' and will be thus ejected from said sockets. Their points will then lie flush with the face of said part A as shown in Fig. 2, or may be slightly removed from said face, thus disconnecting the parts A and B. The fingers now having been thrown out must be maintained in that position. That is to say, they must not be permitted to reëngage until the driven machine is restored to its proper condition for operation. The means for holding the ring L and its fingers in the distended position against the pressure of the spring U consists of a ring or flange V encircling the hub F from which extends a series of fingers W in the direction of the ring L. V' are spaced radial arms extending from the said ring V, and $V^2$ is a ring lying outside of and concentric to the member B. The ring or flange V, the said arms V' and the ring $V^2$ are preferably parts of a single casting.

Each of the arms V' is provided with an arcuate slot $V^3$ concentric to the hub F. At one end all the slots are enlarged to admit the heads of pins 2 secured in the face of and extending from the member B.

The ends of the described fingers W of the ring or flange V are beveled in opposite directions, as shown in Fig. 3, and are designed to receive fingers 3 extending toward them from the ring L. Said fingers 3, as shown in Fig. 5, are extensions of portions 4 cast integral with the ring L and arranged within the bore thereof and are spaced from one another, Fig. 4, and alternate fingers of the series of fingers are beveled in one given direction, Fig. 3, the other fingers being beveled in an opposite direction for the purpose to be described. The spaces between the portions 4 within the ring L are designed to be occupied by the fingers W of the ring or flange V, Fig. 4, when the clutch parts are in operative or driving relation. However, when the fingers M are forced out of the sockets A' in the manner previously described the member comprising the ring V, arms V' and ring $V^2$ is caused to partake of a partial rotary movement so that its fingers W will be placed in line with and abut upon the said fingers 3. To this end in Fig. 4 a spring-barrel 5 is shown secured upon one of the arms V' by any suitable means, for example a screw 6 threaded into said arm. Said barrel has a socket 7 to receive one end of a spring 8 the opposite end of the latter engaging a lug 9 on one of the guides B² opposite said socket. 10 is a hole extending through said spring-barrel 5 adapted to receive one of two pins 11 (Fig. 4) cast with one of said arms V', one lying at each side of the screw 6 of said pins.

The spring 8 maintains a constant pressure upon the spring-barrel 5 because it is compressed between said barrel and one of the guides B² so that the ends of fingers or projections W will be made to engage the ends of the fingers or projections 3 whenever the fingers or parts M are forced out of the sockets or recesses A'. That is to say, when the said fingers or parts M are thus forced out the member V, V', V² is free to turn relative to the portion A and carry with it the fingers or parts M because M and A no longer engage. In Fig. 4 the parts are illustrated in the position they occupy when the clutch is transmitting power, but when the fingers M having been ejected from the sockets A' as explained, the ring L having in consequence been moved outward, the portions 4 have also moved outward since they are integral parts of the said ring L, and are withdrawn from between the fingers W of the ring or flange V. This action having taken place, the compressed spring 8 now acts to partially rotate the ring or flange V so that as the fingers W become free by the withdrawal of the fingers 3 from between them they turn to a position beneath the latter and with them lie end to end as in Fig. 3. The beveled faces of the fingers W in their cam-like action when engaging those of the said finger 3 in turning due to said spring 8 assist in positively forcing the fingers M out of engagement with the member A against said pressure of the spring U and thus maintain them. During the partial rotation of the ring or flange V it has turned to the left and the arms V' have assumed the position shown in broken lines X in Fig. 4 where said arms lie against the guides B² which stop their further movement. There is considerable friction between the sides of the fingers 3 and W at all times while interengaging or lying between one another, as in Fig. 4, due to the action of the spring 8 and at the time the ring L is forced outward in the disengaging action of the fingers M this friction might, perhaps, result in shifting or drawing the ring or flange V along the hub F but this is prevented by the heads of the described pins 2. After the driven machine is restored to proper condition for operation, or where there will be no danger of breaking its parts, the hand piece R of the lever is moved in the direction of the clutch. The first action is to carry the arm extension S down upon the ring V² (dotted lines Fig. 1) which is in constant rotation provided the part B has direct connection with the power. This results in setting up friction between the said extension S and the ring and the latter is for an instant retarded in its rotation with the clutch so as to cause it to turn relatively to said clutch sufficiently to move it against the spring 8 and carry its fingers W from beneath the fingers 3 at which time they will lie opposite the spaces between the latter whereupon the spring U in asserting itself instantly forces the fingers M of the ring L into engagement with the portion A, the portions 4 between the fingers W, and the driving relation being reëstablished.

It is evident that the pressure applied to the hand piece R of the lever P does not push the latter toward the clutch from the fact that the fingers 3 at that time bear against the fingers W. Consequently the first action must be that of creating friction on the ring V² by the part S as explained. As the spring U moves the ring L the latter will naturally carry the lever P to the position shown in full lines in Fig. 1 along with the said ring L.

When a light load is carried the spring U may be given sufficient power to cause the positive engagement of the fingers M and the walls of the sockets A' to take up the load, but where the load is a very heavy one or where it is the desire of the operator, in any event, to hold the fingers M in positive engagement with the part A the lever P after following the spring may be pushed firmly in the direction of the said part A so that the said fingers having once entered the sockets A' will be held manually in engagement and cannot be forced out by the inertia of the machine to be driven. That is to say, the operator through the lever P may exert a pressure in the direction of the part A in excess of that imparted by the said spring U so that positive engagement will be maintained until the load is taken up.

The clutch is adapted for either a right or left drive and the fingers M in being beveled in both directions, Fig. 1, can be forced out of the sockets A' in either direction of rotation. For this reason the fingers W and alternate fingers 3 are beveled in opposite directions as described and shown. When the direction of rotation is clockwise, viewing Fig. 4, there must be a reversal of the position of the parts. That is to say, the spring barrel 5 is inverted, see dotted lines, the spring 8 being positioned so that it will rotate the ring V in a clockwise direction also. In this relation of the parts the bevels of the fingers W and those of the fingers 3 not brought into contact in one direction of rotation will be utilized in the other direction of rotation, either set performing the duty of maintaining the separated relation of the clutch parts.

In the relation of the parts when the device rotates in either direction the arms V' lie midway between the guides B² as shown in Fig. 4. But when the fingers M are held away from the portion A the arms V' will then lie against one or the other of the guides B² depending upon the position the spring 8 may occupy.

It is quite evident that in order to be enabled to restore the clutch to its driving or power transmitting condition while the power operated part is in constant rotation the relation of the member V V' V² and the spring 8 must always be such, with regard to the direction of rotation of the clutch, that when friction is applied to said member by the part S it can be rotated sufficiently to remove its fingers W from beneath the fingers 3 to permit reëngagement.

Besides the fact that the bevels admit of both series of fingers W and 3 engaging so as to positively hold the fingers M disengaged from the part A there is the further advantage that said bevels are of such a length, and are so formed that though the ends of the fingers M may become worn and be forced a less and less distance outward, the said beveled faces of the two series of fingers can still engage and perform their office of holding the parts separated. The area of the contacting faces is such, also, that even after extended use they will not become so worn as to be prevented from properly engaging and performing their required office.

It has been stated that either side of the clutch may be attached to the power. If the knuckle is attached to the power the rings L and V² will remain stationary upon the disengagement of the fingers M and in order to reëngage the parts it is only necessary to grasp the stationary ring V² and turn in the required direction to permit the reëngagement of the said fingers M. Simultaneously with this action, if found necessary or desirable, the hand lever P, as before, can be held with pressure of the hand in the direction of the part A so as to cause and maintain a positive driving relation or until the inertia of the machine has been overcome.

Another advantage of my clutch is that in case of accident to any of the driven parts the operator may manually withdraw the fingers M from the sockets A' by means of the hand lever, the fingers W performing their work as before to maintain the disengaged relation of the parts. For the sake of brevity in some of the claims the ring V, its arms V' and the ring V² will be referred to as a single element by the term "member."

I may make such changes in the clutch structure as may suggest themselves but these changes will lie within the meaning of the invention and the scope of the claims. As a matter of fact in most instances it is preferable to have the shaft F' the driven member from the fact that the portion having the universal joint, the driving member, can be swung to any desired position, the weight of said joint being supported by said shaft. In this manner of use the ring or flange V and its part V² is always in rotation and must be retarded by friction applied to it to release the ring L for the reëngagement of its fingers.

The operation of the device is as follows:—The parts being in engagement and having the position shown in Fig. 1, the driving power being transmitted to the portion A through E and C, the "driven" shaft F' will be rotated. The spring U is adjusted by means of the nut G for the load to be carried. However, when this load is increased due to any cause in the driven machine such as to endanger breakage of the parts, the fingers M will be forced out of the recesses A' due to the lag in the rotation of the driven machine and the angled walls of the sockets or recesses A' and the angled ends of the fingers M. This forces the ring L outward, together with the lever P, until its fingers 3 are withdrawn from between the fingers W of the member V, V', V² whereupon the spring 8 in control of the latter partially rotates it so as to bring its said fingers W opposite the fingers 3 to hold the ring L in the position to which it is moved. The portion A now rotates but the shaft F' remains idle. Upon the machine being restored to proper running condition the hand lever R is moved toward the portion A. The first pressure applied to it overcomes the tension of the spring T and carries the extension S upon the part V² of the member V V' V² which rotates with the said portion A and the frictional engagement of the said extension S therewith, due to a firm pressure of the hand, retards its rotation and causes its fingers W to be moved from beneath the fingers 3, the spring U instantly forcing the fingers M toward the portion A to reëngage the recesses or socket A'.

The value of the lever P, in addition to permitting friction to be applied to the ring V² through the part R, is that in the event that the spring U cannot hold the fingers M in the recesses when taking up the load, a steady pressure upon said lever toward the portion A will maintain engagement of the fingers M with the recesses until the inertia of the load has been overcome. This structure and the advantage derived from it particularly distinguishes my device from the known art. Where a device used for disengaging a driven part from a driving part under overload is not so constructed or adapted to take up the load and overcome the inertia of the load in so doing, manual effort is necessary to hold the parts in engagement until such inertia is overcome.

Since all machines are not driven in the same direction my device is adapted for either direction of rotation by merely inverting the spring-barrel to change the direction of applied pressure of the spring 8 and, as has been explained, the ends of the fingers W and 3 are beveled in opposite directions to give the member V V¹ V² an equal opportunity to perform its functions in either direction of their movement to lock the fingers M outward.

My device differs from others in that I am enabled to cause the reëngagement of the clutch parts whether the clutch portion carrying the ring V and its part V² is idle while the other is rotating, or whether said portion itself is in constant rotation and herein lies one of its values. Again, of considerable importance is the fact that the lever P in having absolute control of the clutch part L can be used to perform all the functions of the ordinary clutch or tight and loose pulley structure, either of which is commonly used for engaging or disengaging the driving and driven elements. It is well known that a "break pin" coupling is used between a driving and a driven element together with the ordinary clutch, as stated, or with the tight and loose pulley.

The ordinary coupling mentioned includes two parts connected by pins that can be sheared off under overload and when this occurs it is necessary, at a loss of considerable time and much labor, to replace the pins which are sometimes bolts or other metal parts which may be handy to the operator and which when used becomes a source of such danger to the machine since should overload occur said bolt or other part cannot be sheared off. My clutch, however, is constructed so that it throws out automatically and can be instantly thrown into action upon the driven machine being restored to condition for operation by means of the lever P. This lever is the part also taking the place of the ordinary clutch lever or the said tight and loose pulley.

Having thus described my invention, I claim:—

1. In a device of the class described, the combination of a driving and driven portion, a clutch part carried by and rotatable with one of the portions and adapted to engage and rotate the other said part adapted by its construction and that of said other portion to be moved from engagement with the latter under overload, means constantly tending to hold the part elastically in engagement with the said portion, and a member including a part adapted to engage the clutch part and hold it disengaged, said member also including a portion in position to be engaged during its rotation to change its relation and to release the described clutch part.

2. In a clutch, the combination of two rotatable portions abutting upon one another, a part carried by one of the portions and adapted to move in the direction of and to engage the other, the said part and the last named portion having substantially correspondingly formed engaging faces, said part adapted to be removed under overload from the portion with which it engages, means constantly tending to reëngage the part, a member adapted to be automatically moved to engage and hold the part in its disengaged position, and including a portion adapted to be manually operated during the rotation of the clutch to release the part and permit its reëngagement.

3. In a clutch, the combination of two rotatable facing portions, a part carried by and rotatable with one of the portions and adapted to move in the direction of and engage the other, the latter and said part including inclined engaging surfaces, elastic means to hold the part in engagement with the inclined surfaces of the portion, the part and said portion adapted to separate under overload in opposition to the force exerted by said means, a member to engage the part after disengagement and prevent its reëngagement, means to move the member automatically into engagement with said part, said member including a ring portion adapted for rotation with one of the clutch portions and in position to be engaged during its rotation whereby to move it relatively to and to release the described part.

4. The combination of two clutch portions, a part rotatable with one of them including extensions adapted to engage the other, the latter including recesses in its face to receive the extensions, the walls of the said recesses and the surfaces of the engaging portions of the extensions being beveled and adapted under overload to cause the latter to be disengaged, means to elastically hold the described part in engagement with the portion having the recesses, a member rotatable with one of the portions and adapted to automatically engage and hold the part outward when disengaged and maintain it in its disengaged position, said member including an annular extension or ring, and a manually operated device to engage the annular portion or ring to momentarily retard it in its rotation and liberate the said part.

5. The combination of two clutch portions, a part rotatable with one of the portions including extensions adapted to engage the other of said portions, said other portion including recesses in its face to receive the extensions, the walls of the said recesses and the surfaces of the engaging portions of the extensions being beveled and adapted under overload to cause said extensions to be forced outward, means constantly tending to move the part toward and hold its extensions elastically in engagement with the recessed portion, a member rotatable with one of the portions and adapted to enter behind and hold the part and its extensions outward, elastic means to move said member behind said part, said member including an annular extension or ring, and a manually operated device adapted to be carried into engagement with the annular extension or ring, and also permanently engaging the said part.

6. The combination of two clutch portions, a part rotatable with one of them including extensions adapted to engage the other, the latter including recesses in its face to receive the said extensions, the walls of the said recesses and the surfaces of the engaging portions of the extensions being beveled in opposite directions and adapted under overload to separate in either direction of rotation, means constantly tending to move the part and its extension into engagement with the recesses, a member rotatable with the portion of the clutch carrying said part and adapted to engage and prevent reëngagement of said part when forced out and adapted to move in either direction relatively to the portion carrying it, a spring reversible in position and engaging the member whereby to operate it in either direction, said spring in either of its positions also engaging the portion carrying said member.

7. The combination of two clutch portions, a part rotatable with one of said portions including an extension adapted to engage the other of the portions, the latter and the extension having correspondingly inclined engaging surfaces adapted under overload to separate and move the said part away from said portion in a direction parallel to the axis of their rotation, a member carried by and rotatable with the last named portion and adapted for partial axial movement relative to said portion and adapted to engage behind and maintain the part in its disengaged position, a spring held constantly under compression adapted to rotate the member upon the disengagement of the part, and said member adapted to receive the spring in one of two opposite positions whereby to operate said member during either direction of rotation of said clutch portions.

8. The combination of two clutch portions, a part rotatable with one of them including an extension adapted to engage the other of the portions, the latter and the extension having correspondingly inclined engaging surfaces adapted under overload to cause the extension to be moved free of said portion in a direction parallel to the axis of rotation of the clutch portions, a member carried by the portion with which the extensions engage and adapted for partial movement relatively to it and said portion and adapted to engage and maintain the said part in its disengaged position, the member being otherwise without movement in any other direction, a spring reversible in position and adapted to engage the member, whereby to shift it in either of two directions.

9. In a clutch, the combination of two clutch portions having abutting faces, a part rotatable with one of the portions and adapted to move relatively to it in a direction parallel to the axis of rotation of said portion, said part and the other portion each including a pair of correspondingly inclined engaging surfaces arranged whereby the described part and its associated portion are adapted to separate under overload in either direction of their rotation, a member rotatable with the part and adapted for a partial rotation relatively to it in either direction and adapted to engage and hold said part disengaged, a spring engaging the member and mounted for a reversal in position and adapted to move said member in either direction according to the direction of rotation of the clutch portions, the member and the part including engaging portions having inclined surfaces.

10. A clutch comprising two clutch portions, a part carried by and rotatable with one of the portions and including extensions having oppositely inclined end surfaces, the other portion having recesses to receive said extensions the walls of the recess being correspondingly inclined, said part adapted to elastically engage in the recesses and ejected therefrom by an overload, a member rotatable with the portion carrying said part and adapted for a partial rotary movement relative to it, a spring engaging and controlling the member and reversible in position whereby to impart movement to said member in either direction, said member including extensions having oppositely inclined surfaces, the said part also including portions having oppositely inclined surfaces engaged by those of the member when the said part is ejected from the clutch portion having the said recesses.

11. A device of the character described including in its construction two rotatable facing clutch portions, a part carried by one of the portions and rotatable with it, the other portion having a series of recesses, the said part including extensions to engage the recesses, the said recesses and the ends of the extensions being formed whereby to disengage said part from said recesses when the device is placed under overload, means to elastically hold the extensions in the said recesses, a member rotatable with one of the portions to engage and hold the said part disengaged from the recessed portion, and a spring to automatically move said member to its engaging position, said member including a part in position to be manually engaged during the rotation of the mechanism for restoring the clutch portions to their driving relation.

12. A clutch comprising two portions having abutting faces, one of the portions including a series of recesses in its face having oppositely inclined surfaces, a part carried by and rotatable with one of them including extensions whose ends have correspondingly inclined surfaces, means to elastically hold the extensions in engagement with the recesses and adapted to yield under overload, a member carried by the portion having said part and adapted when said part is forced outward under overload to engage it and hold it in its disengaged position, and a manually operated device to be brought into contact with the said member.

13. A clutch comprising two portions having abutting faces one of the portions including a series of recesses in its face having oppositely inclined surfaces, a part carried by and rotatable with one of them including extensions whose ends have correspondingly inclined surfaces, means to elastically hold the extensions in engagement with the recesses and adapted to yield under overload, a member carried by the portion having said part and adapted when said part is forced outward under overload to engage it and hold it in its disengaged position, and a manually operated device to engage the said part and including a portion adapted to be brought into contact with the said member.

14. A clutch comprising two portions having abutting faces one of the portions including a series of recesses in its face having oppositely inclined surfaces, a part carried by and rotatable with one of them including extensions whose ends have correspondingly inclined surfaces, means to elastically hold the extensions in engagement with the recesses and adapted to yield under overload, a member carried by the portion having said part and adapted when said part is forced outward under overload to engage it and hold it in its disengaged position, and a manually operated device to engage the said part, and a portion pivoted to the device adapted to be brought into contact with said member.

15. A clutch comprising two portions, a part rotatable with and driven by one of the portions, said part and the other said portion adapted for driving engagement whereby the described portions will rotate together as a unit, a spring to hold the part elastically in engagement with the second named portion, the said part and said second named portion being adapted to separate under overload, a spring actuated member adapted to engage and hold the part disengaged after its separation, a manually operated device adapted to be carried into engagement with the member during its rotation with the clutch parts to change its position to release and permit the described part to reëngage the said second clutch portion.

16. A clutch comprising two portions, a part carried and rotated by one of said portions and adapted to move relative to it parallel to its axis of rotation, said part and the other clutch part adapted for driving engagement whereby one of said portions is driven by the other, means to hold the part elastically in engaging and driving relation to said other portion, said part and the last named portion having engaging faces adapted to cause separation of the described elements under overload, a member adapted to engage and hold the part disengaged, and a spring controlling the member adapted to move it into such engagement, said member including an extension in position to be manually engaged during the rotation of the mechanism to retract the member for permitting the reëngagement of the part and its clutch portion.

17. A clutch comprising two portions, a part carried and rotated by one of said portions and adapted to move relative to it parallel to its axis of rotation, said part and the other clutch part adapted for driving engagement whereby one of said portions is driven by the other, means to hold the part elastically in engaging and driving relation to said other portion, said part and the last named portion having engaging faces adapted to cause separation of the described elements under overload, a member adapted to engage and hold the part disengaged, a spring controlling the member adapted to move it into such engagement, said member including an extension in position to be manually engaged during the rotation of the mechanism to retract the member for permitting the reëngagement of the part and its clutch portion, and a manually operated device having operative engagement with the part to positively hold it in its reëngaged relation.

18. A clutch comprising two portions, a part carried and rotated by one of said portions and adapted to move relative to it parallel to its axis of rotation, said part and the other clutch part adapted for driving engagement whereby one of said portions is driven by the other, means to hold the part elastically in engaging and driving relation to said other portion, said part and the last named portion having engaging faces adapted to cause separation of the described elements under overload, a member adapted to engage and hold the part disengaged, a spring controlling the member adapted to move it into such engagement, said member including an extension in position to be manually engaged during the rotation of the mechanism to retract the member for permitting the reëngagement of the part and its clutch portion, a manually operated device having operative engagement with the part to positively hold it in its reëngaged relation, and a manually operated device adapted to be brought into engagement with the said extension and having operative engagement with the said part to positively hold it in its reëngaged relation.

19. A clutch comprising two rotatable portions, one adapted to be rotated by the other, a part carried and rotated by one of the portions, and adapted to operatively engage the other in driving relation in either direction of rotation, a spring to hold the part elastically in such engagement, and both including engaging faces arranged at an angle whereby the part is moved against said spring in either direction of rotation to automatically disengage under a load in excess of that for which the mechanism may be adjusted, a member adapted to engage and hold said part in its disengaged position, elastic means to carry the member into such engagement and adapted for adjustment to two different positions whereby the member is made to engage the part in either direction of rotation of the mechanism, said member including a part adapted to be manually engaged in the rotation of said mechanism to retract it and permit the reëngagement of the separated elements.

20. A clutch comprising two portions having normal driving relation, one of them having constant rotation in use, a part operatively engaging both to maintain such driving relation and adapted to be disengaged from one of them under overload, means to maintain an elastic pressure upon the part, a member adapted to engage and hold the part in its position of disengagement and rotatable with said part, a spring engaging the member and constantly tending to move it to a position for holding the said part disengaged, said member including an extension in position to be manually engaged to retract it during its rotation for releasing said part and permit its reëngagement.

21. In mechanism of the class described, a driving and a driven element, mechanism in permanent engagement with one of them and adapted to engage the other and rotatable with both and adapted to connect both in driving relation including a spring, and adapted to be operated against said spring due to an overload to terminate the said driving relation of the elements, and a spring-held member to maintain the separated relation thereof, including an extension in position to be manually engaged during rotation of the mechanism.

22. In mechanism of the class described, a driving and a driven element, mechanism in permanent engagement with one of them and adapted to engage the other and rotatable with both and adapted to connect both in driving relation including a spring, and adapted to be operated against said spring due to an overload to terminate the said driving relation of the elements, a spring-held member to maintain the separated relation thereof including an extension in position to be manually engaged during rotation of the mechanism, and a manually operated device operatively engaging part of the said mechanism to positively hold said part in driving relation with the element with which it is adapted to engage.

23. In mechanism of the class described, a driving and a driven element, mechanism in permanent engagement with one of them and adapted to engage the other and rotatable with both and adapted to connect both in driving relation including a spring, and adapted to be operated against said spring due to an overload to terminate the said driving relation of the elements, a spring-held member to maintain the separated relation thereof including an extension in position to be manually engaged during rotation of the mechanism, said device including a part adapted to be carried into contact with the extension of said member.

24. In a clutch, the combination of two rotatable clutch parts, one of them adapted to rotate relatively to the other, a member mounted upon and rotatable with one of them and adapted to have driving engagement with the other of the parts whereby both parts rotate together, and arranged to have a movement in line with its axis of rotation, means to hold the member elastically in engagement with said other part, means also mounted upon one of the parts adapted to rotate therewith and arranged to have a movement in the directions about the axis of its rotation and including an extension arranged to be carried into the path of movement of the member to hold that member out of engagement with said part, means in engagement with the last named means to elastically hold it in a position between the limits of its movement with its extension in said path of movement of the member, and a manually operated part adapted to be moved into engagement with the said last named means during its rotation to change its position relatively to the part that carries it to remove its extension from behind the member.

In testimony whereof I affix my signature, in presence of two witnesses.

HARVEY V. GIBSON.

Witnesses:
W. I. SLEMMONS,
L. M. THURLOW.